United States Patent [19]
Bennett et al.

[11] Patent Number: 5,747,893
[45] Date of Patent: May 5, 1998

[54] TERMINATION SCHEME FOR TWISTED-WIRE PAIRS

[75] Inventors: Arthur T. Bennett; Stephen L. Baum, both of Dallas County; Scott K. Rubenstein, Denton County; Gary A. Randall, Tarrant County, all of Tex.

[73] Assignee: Compaq Computer Corporation, Houston, Tex.

[21] Appl. No.: 644,228

[22] Filed: May 10, 1996

[51] Int. Cl.$^6$ ........................................ H04B 3/30
[52] U.S. Cl. .................................................. 307/100
[58] Field of Search ........................... 307/89, 100, 106; 370/85.1, 85.9, 124; 364/514 C, 242.95, 940.62; 395/852; 333/124, 17.3, 32, 12; 326/30

[56] References Cited

U.S. PATENT DOCUMENTS

| | | | |
|---|---|---|---|
| 4,063,109 | 12/1977 | van de Mark | 307/106 |
| 4,885,747 | 12/1989 | Foglia | 307/124 |
| 5,438,571 | 8/1995 | Albrecht et al. | 370/85.9 |
| 5,517,487 | 5/1996 | Fridland et al. | 370/85.1 |
| 5,587,692 | 12/1996 | Graham et al. | 333/12 |

*Primary Examiner*—Richard T. Elms
*Attorney, Agent, or Firm*—Stanford & Bennett

[57] ABSTRACT

A termination scheme for twisted-wire pairs for network communication systems, such as Fast Ethernet 100BaseTX, where the wires are electrically connected together and a single resistor is coupled in series between the junction of the wires and ground. A capacitor may also be coupled between the resistor and ground for DC isolation purposes. The single resistor preferably has a resistance equivalent to half of the common mode impedance between the unused pairs. The two wires of each pair are shorted together since there is no differential signal between the two wires. In this manner, two differential impedance resistors are eliminated, thereby reducing size and cost of the system without degrading performance.

20 Claims, 3 Drawing Sheets

TERMINATION SCHEME FOR TWISTED-WIRE PAIRS

FIELD OF THE INVENTION

The present invention relates to electrical termination, and more particularly to a termination scheme for twisted-wire pairs to reduce or substantially eliminate electromagnetic interference.

DESCRIPTION OF THE RELATED ART

ETHERNET™ is a shared-media network architecture defined in the Institute of Electrical and Electronics Engineers (IEEE) 802.3 standard, and is currently the most widely used architecture for local-area networks (LANs). ETHERNET™ generally uses a bus topology having nodes attached to a trunk segment, which is the main piece of cable in an ETHERNET™ network. The 10BaseT is a variant architecture based on the IEEE 802.3 standard, which is a baseband 802.3-based ETHERNET™ network that operates up to 10 Mbps (Megabits per second), and uses unshielded twisted-pair (UTP) cable configured in a star topology. A 10BaseT architecture is also known as twisted-pair ETHERNET™ or UTP ETHERNET™.

A new ETHERNET™ standard has emerged, referred to as Fast ETHERNET™ or 100 Mbps Ethernet™, which includes implementations capable of 100 Mbps transmissions speeds and is defined in IEEE 802.3 u. Several variant schemes are defined in the 802.3 u standard, including a 25 MHz twisted-wire pair scheme referred to as 100BaseT4, and a 125 MHz twisted-wire pair scheme referred to as 100BaseTX. Also, a 100BaseFX scheme is defined for use with fiber optic cables. Although the present invention is advantageous for use in networks based on ETHERNET™, it may be used in any wired-link network architecture using one or more twisted-wire pairs.

In a star configuration, several nodes or computers are connected together through a common hub. A hub is a component that serves as a common termination point for multiple nodes and that can relay signals along the appropriate paths. Generally, a hub is a box with a number of connectors to which nodes are attached. Hubs usually accommodate 4, 8, 12, 24 or more nodes, and many hubs include connectors for linking to other hubs. Each node in the network is typically a computer of some type, such as a personal computer (PC), MACINTOSH™, minicomputer, mainframe, etc., where the computer generally includes a network interface card (NIC) for interfacing the node to the hub to enable networking capabilities.

A wired-link network architecture typically uses 50-ohm coaxial cable, but variant architectures use 50- or 75 ohm($\Omega$) coaxial, twisted-pair, and fiber-optic cable. Each type of cable includes appropriate and characteristic connectors and terminators. The present invention primarily concerns electrical termination techniques for twisted-wire pairs. A twisted-wire pair is composed of two small insulated conductors or wires spirally twisted together, often without a common covering. The two wires include a signal and a return wire which are twisted around each other, so that both wires have nearly equal exposure to any electrostatic or electromagnetic interference (EMI) to thereby reduce differential noise. The two primary types of twisted-wire pairs include UTP and shielded twisted pair (STP). A plurality of twisted-wire pairs may be incorporated within a single cable surrounded by a protective sheath, where such cables are referred to herein as twisted-pair cables.

For the 10Basex or 100Basex ETHERNET™ notations, the first prefix number refers to the speed of the network, the middle designation refers to the band type, and the suffix refers to the physical medium through which the signals are carried. The speed is usually designated in Mbps, such as 10 or 100 Mbps. The band is typically either baseband or broadband. A baseband network allows one node to broadcast at a time as compared to a broadband network, where multiple nodes can broadcast at the same time. Variations of the ETHERNET™ 802.3-based standard support broadband communications. The physical medium is typically twisted-pair, such as T4, TX or VG, for example, although other mediums are known, such as 10BaseF for fiber-optic cable, including fiber passive (FP), fiber link (FL) and fiber backbone (FB). The designation T4 refers to the use of four pairs of twisted-wire, each capable of at least category 3 transmissions, where category 3 is one category of a plurality of categories defined by the Telecommunications Industry Association (TIA) in a TIA-568 standard. The higher the category number, the higher the quality of the cable and the better the transmission characteristics. Category 3 wires or cables are capable of transmission speeds up to 10 Mbps, whereas category 5 cable supports 100 Mbps transmission. The 100BaseT4 enables 100 Mbps transmission by utilizing all four pairs of twisted-wires operating at 25 Mega-Hertz (MHz). The designation VG refers to voice grade, which also uses category 3 twisted-wire pairs. The designation TX for 100BaseTX requires at least two category 5 twisted-wire pairs.

RJ-45 modular connectors or variations thereof are typically used for twisted-pair cables. The RJ-45 connector may by used for Fast networks operating at 100 Mbps or more, but another connector based on the International Standardization Organization (ISO) 8877 standard may also be used, which is a variant of the RJ-45 connector compatible with connectors in other countries. An RJ-45 connector is similar to, but larger than, a typical RJ-11 phone connector and includes four twisted-wire pairs within a twisted-pair cable. The 100BaseT4 scheme uses all four pairs, where a first pair is used for a transmit signal (XMT), a second pair is used for a receive signal (RCV) and the remaining two pairs are used in bi-directional fashion. In particular, each transmitting device transmits the signal on three of the four pairs. In the 100BaseTX scheme, one twisted pair is used for the XMT signal, a second pair is used for the RCV signal, and the remaining two pairs are unused.

The twisted-wire pairs in a twisted-pair cable usually require some form of electrical termination to reduce or otherwise eliminate unwanted noise or electromagnetic interference (EMI), which might otherwise negatively affect or otherwise degrade the signals. Such termination is usually necessary to meet the Class A certification of the Federal Communications Commission (FCC), which defines requirements for computer or other equipment intended for industrial, commercial, or office use, rather than for personal use at home. The termination scheme for twisted-wire pairs being used depends upon the particular communication protocol. Unused twisted-wire pairs must also be terminated, since noise on the unused pairs will interfere with signals on the used pairs. In particular, if the unused pairs are not properly terminated, noise ringing on these pairs tends to interfere with the signals on the nearby pairs being used for communication. Such termination is required at both ends to absorb noise on and to reduce EMI radiated from the wires. For example, without an appropriate terminator at both ends of a cable, a signal asserted or otherwise imposed on a the cable travels to the end of the cable and may be reflected back along the cable causing "ringing". Such ringing may be radiated and interfere with signals on nearby pairs. One form of noise is referred to as crosstalk, where a signal asserted on a first wire establishes an electrical field, which interferes with or otherwise coupled to an adjacent or nearby wire. External signals may also be coupled into the signal wires causing noise and degrading the signals.

To alleviate the problems of electrical noise, a terminator is placed at both ends of the wires or cables to absorb noise and prevent electrical reflections. A terminator typically includes an impedance which matches the characteristic impedance of the wire being terminated. The terminating impedance appears to extend the wire indefinitely, thereby absorbing the signals and preventing them from bouncing back and ringing on the wire. The impedance is typically composed of two parts, including a differential impedance between the two wires of the pair and a common mode impedance of the pair with respect to a third reference voltage level, such as ground.

The termination impedance has usually been implemented with a plurality of resistors and capacitors coupled between the ends of the wires and ground. The typical scheme used in hubs, NICs and other communication devices to achieve termination of twisted-wire pairs usually includes two resistors, R1 and R2, placed in series with each wire, where each resistor R1 and R2 represents half of the differential impedance of the pair of wires. A third resistor R3 is also provided, which, together with the first two resistors R1 and R2 represents the common mode impedance of the pair. A plurality of capacitors are typically coupled between the resistors and ground for purposes of direct current (DC) isolation.

Although this typical scheme including three resistors provided the appropriate level of termination, each additional part adds undesirable cost and consumes valuable space on the communication devices. It is desirable to reduce cost and size of the termination devices.

SUMMARY OF THE INVENTION

A termination scheme for twisted-wire pairs according to the present invention for network communication systems, such as Fast ETHERNET™ 100BaseTX, where the wires are connected together and a single resistor is coupled in series between the wire junction and ground. A capacitor may also be coupled between the resistor and ground for performing DC isolation. The single resistor preferably has a resistance equivalent to half of the common mode impedance between the unused pairs. The two wires of each pair are shorted together since there is no differential signal between the two wires. In this manner, two differential impedance resistors are eliminated, thereby reducing the size and cost of the system without degrading performance. A termination scheme according to the present invention improves or otherwise reduces undesirable emissions.

In one embodiment, a terminator according to the present invention for terminating a twisted-wire pair includes a conductive junction for electrically coupling the wires of the twisted-wire pair together, and an isolation resistor coupled between the conductive junction and ground. The isolation resistor preferably has a resistance equivalent to half of a common mode impedance between the twisted-wire pair and another twisted-wire pair, where the common mode impedance is preferably approximately 75Ω. A capacitor is preferably coupled between the resistor and ground for providing DC isolation.

A termination circuit according to another embodiment of the present invention for terminating first and second unused twisted-wire pairs of a multiple twisted-pair cable, includes first and second conductive junctions for electrically connecting together individual wires of the first and second twisted-wire pairs, respectively, and first and second resistors coupled between the first and second conductive junctions, respectively, and ground. The first resistor and second resistors preferably have resistances equivalent to half of a common mode impedance between the first and second unused twisted-wire pairs with respect to each other. First and second capacitors may be coupled between the first and second resistors, respectively, and ground. Alternatively, both isolation resistors may be coupled to a single DC isolation capacitor.

The present invention is particularly advantageous for terminating both ends of unused twisted-wire pairs of a multiple twisted-pair cable, such as an RJ-45 cable used for providing four twisted-wire pair connections between communicating devices of a wired-link network architecture. Such systems include multiport hubs, where each port must properly terminate two of the four twisted-wire pairs. Since the hub may include 12, 24 or more ports, the elimination of two isolation resistors without any degradation in function substantially reduces the size and cost of the hub. Further noise reduction may be achieved by coupling the terminators together. Also, further size and cost savings may be achieved by combining the capacitors of all the terminator circuits into a single capacitor, which may be implemented as a discrete capacitor or by any method of providing capacitance as known to those skilled in the art.

It is appreciated that two of the three resistors used in a standard termination scheme are eliminated by using a termination scheme according to the present invention, thereby substantially reducing the size and cost of a network system without degrading performance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
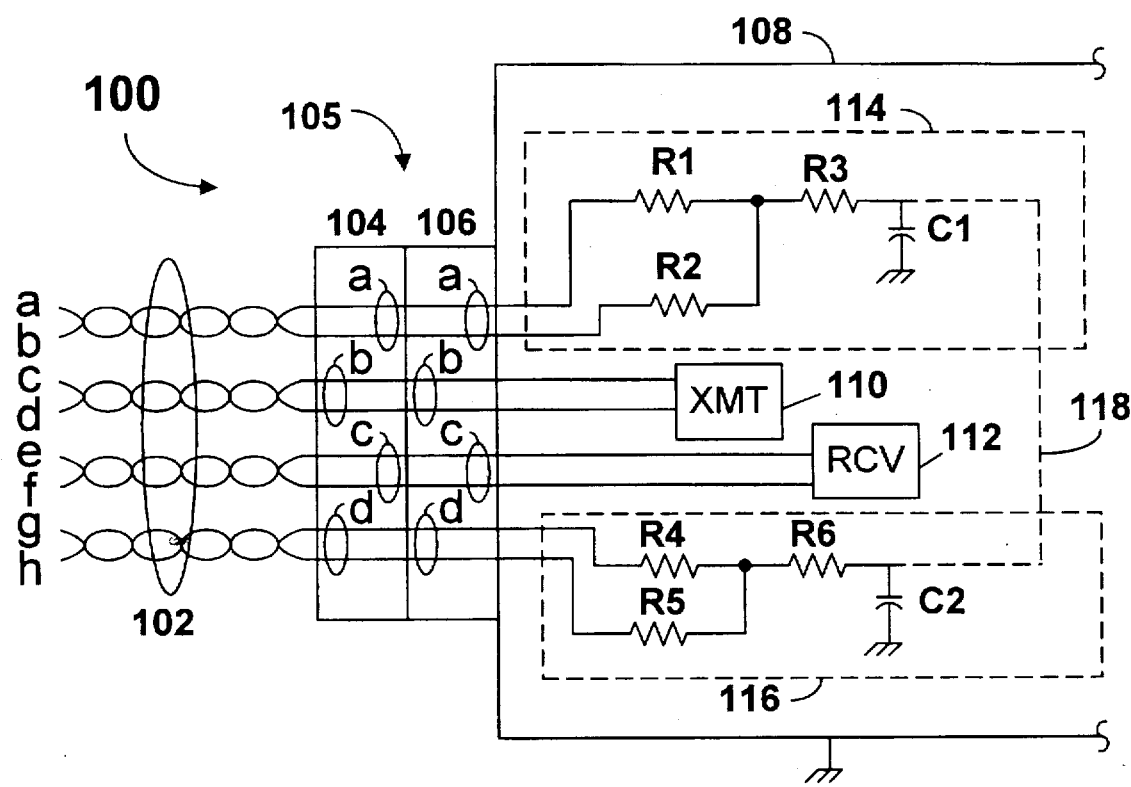
FIG. 1 is a schematic diagram of a port connection including a termination scheme according to prior art.

Referring now to FIG. 1, a schematic diagram is shown of an input/output (I/O) port 100 of a hub system 108 including a termination scheme according to prior art. A twisted-pair cable 102 preferably includes four twisted-wire pairs, including pair 102a,b with wires 102a and 102b twisted together, pair 102c,d with wires 102c and 102d twisted together, pair 102e,f with wires 102e and 102f twisted together and pair 102g,h with wires 102g and 102h twisted together. An RJ-45 plug 104 is integrally coupled to the twisted-pair cable 102 for enabling individual connection of each of the wires of the twisted-wire pairs. In particular, the RJ-45 plug 104 includes electrically separate conductor pairs, 104a, 104b, 104c, 104d, electrically connected to the pairs 102a,b, 102c,d, 102e,f and 102g,h. The RJ-45 plug 104 is electrically and mechanically configured to mate with a compatible RJ-45 jack 106, which also includes pairs of electrically separate conductor pairs 106a, 106b, 106c and 106d for electrically mating with corresponding conductor pairs 104a, 104b, 104c and 104d of the RJ-plug 104. The RJ-45 jack 106 is integrally mounted to the hub system 108, where mating of the RJ-45 plug 104 with the RJ-45 jack 106 establishes an RJ-45 connection 105 for enabling electrical connection of the twisted-wire pairs of the twisted-pair cable 102 to the internal circuitry of the hub system 108. Although a hub is shown as an exemplary device, it is understood that the present invention is applicable for terminating twisted-wire pairs for other communication devices, such as a network interface card (NIC).

In the preferred embodiment, the pair 102c,d is preferably used for a transmit (XMT) signal and the pair 102e,f is used for a receive (RCV) signal, whereas the remaining two pairs 102a,b and 102g,h are not used for communication purposes. In the preferred embodiment, the RJ-45 connection 105 enables connection of the pair 102c,d to a transmit circuit 110 within the hub system 108. In a similar manner, the pair 102e,f is connected to a receive circuit 112 within the hub system 108 through the RJ-45 connection 105. Also in the preferred embodiment, the unused pair 102a,b is coupled to a terminator circuit 114 and the pair 102g,h is connected to a termination circuit 116 within the hub system 108.

In particular, the wire 102a is connected to one end of a resistor R1 and the wire 102b is connected to one end of a resistor R2. The other ends of the resistors R1 and R2 are connected together and to one end of a resistor R3, having its other end connected to one end of a capacitor C1. The other end of the capacitor C1 is connected to chassis ground of the hub system 108. In a similar manner, the wire 102g is connected to one end of a resistor R4 and the wire 102h is connected to one end of a resistor R5 within the termination circuit 116. The other ends of the resistors R4 and R5 are connected together and further connected to one end of a resistor R6. The other end of the resistor R6 is connected to one end of a capacitor C2, having its other end connected to chassis ground. A dotted conductor 118 illustrates that the junctions between R3 and C1 and between R6 and C2 may optionally be electrically connected together in some embodiments.

The resistances of the resistors R1 and R2 are chosen to correspond to the differential impedance ($Z_{OD}$) between the individual wires 102a and 102b or 102g and 102h according to the following equation (1):

$$R1 + R2 = Z_{OD} \qquad (1)$$

Also, the resistances of the resistors R1, R2 and R3 are chosen to correspond to the common mode impedance ($Z_{OC}$) of the pair 102a,b with respect to the pair 102g,h according to the following equation (2):

$$R1 \| R2 + R3 = \frac{Z_{OC}}{2} \qquad (2)$$

where the parallel lines ($\|$) denote that the resistors R1 and R2 are electrically connected in parallel.

The resistors R1 and R2 are preferably equal and have a resistance of approximately 50Ω each. The resistor R3 is preferably approximately 50Ω, so that $Z_{OD}$ is approximately 100Ω and $Z_{OC}$ is approximately 150Ω, where each twisted-wire pair 102a,b and 102g,h is terminated with half the common mode impedance or $Z_{OC}/2$. The capacitor C1 provides DC isolation to chassis ground for the pair 102a,b, and typically has a value of approximately 50 pF. In general, the capacitor C1 serves as an AC ground or a short to ground for the frequency of interest, which is preferably approximately 25 MHz or higher. The resistance values of the resistors R4, R5 and R6 are chosen for similar relationships as described in equations 1 and 2 above, where the resistors R4, R5 and R6 correspond to the resistors R1, R2 and R3, respectively, and are each preferably 50Ω. The capacitor C2 is also approximately 50 pF for providing DC isolation to chassis ground for the pair 102g,h in a similar manner as C1.

The port 100 illustrated in FIG. 1 including termination for the unused pairs 102a,b and 102g,h is effective for reducing or otherwise eliminating crosstalk and other EMI noise which could interfere with the transmit and receive signals appearing on the twisted-wire used pairs 102c,d and 102e,f. It is noted, however, that the termination circuits 114 and 116 each comprise a plurality of resistors R1, R2 and R3 or R4, R5 and R6, as well as the capacitors C1 and C2, which adds significant cost to the overall system. Furthermore, the plurality of resistors consume valuable space within the hub system 108. The additional cost and space of the termination circuits 114 and 116 is multiplied for typical hubs, which include a plurality of ports 100 and a corresponding plurality of RJ-45 jacks 106. Therefore, at least two such termination circuits are required for each port of the hub system 108, which may include 5, 8, 10, 12, 20, 24 or even up to 100 or more such ports 100 depending on the particular embodiment. It is therefore desirable to reduce the cost and size of the termination circuits 114 and 116, since such cost and size is multiplied in a typical multiport hub, such as the hub system 108.

Figure 2:
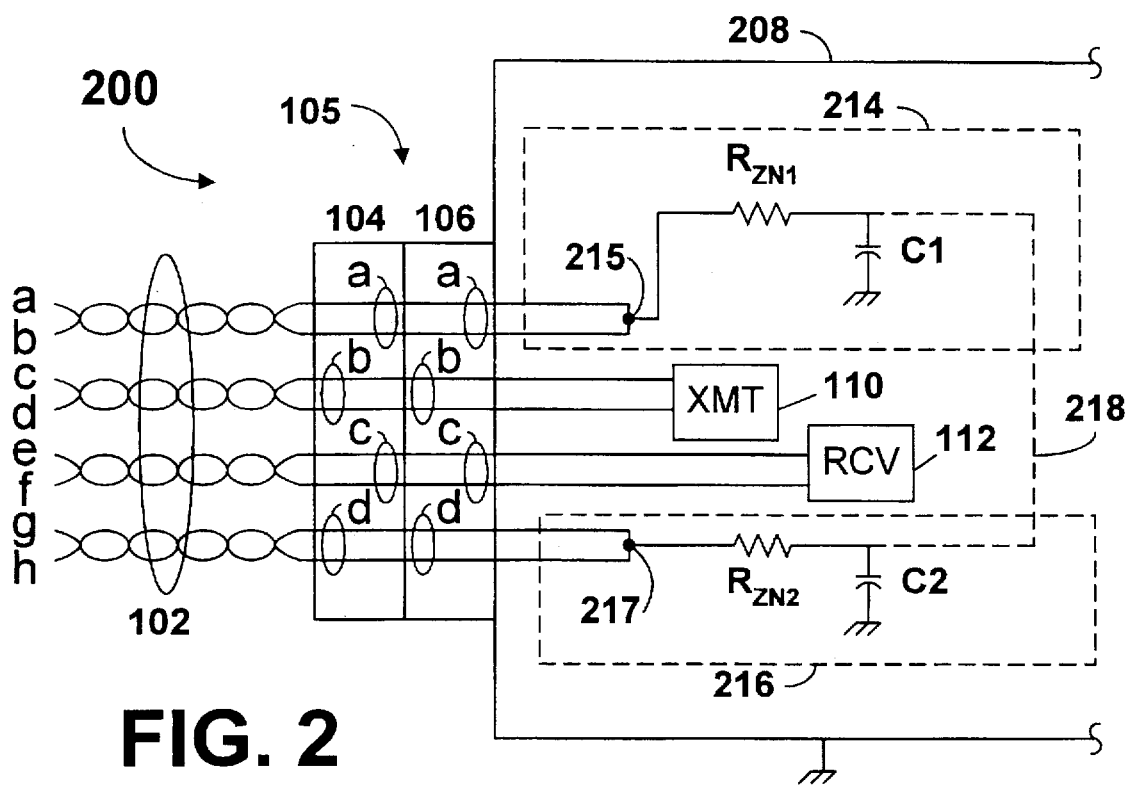
FIG. 2 is a schematic diagram of a port connection including a termination scheme according to the present invention.

Referring now to FIG. 2, a schematic diagram is shown of a port 200 of a hub system 208, which includes a termination scheme for unused twisted-wire pairs according to the present invention. The twisted-pair cable 102 is shown coupled to the RJ-45 plug 104 and mated to the corresponding RJ-45 jack 106 forming the RJ-45 connection 105 in a similar manner as shown in FIG. 1. However, the RJ-45 jack 106 is connected to the hub system 208, which is similar to the hub system 108, except including termination circuits 214 and 216 implemented according to the present invention. The RJ-45 connection 105 enables connection of the pairs 102c,d and 102e,f to transmit and receive circuits 110, 112, respectively, in a similar manner as shown in FIG. 1. However, the pair 102a,b is coupled to the termination circuit 214 and the pair 102g,h is connected to the termination circuit 216 through the RJ-45 connection 105. In particular, within the connection circuit 214, an electrically conductive node or junction 215 electrically couples the wires 102a and 102b of the pair 102a,b together. The conductive junction 215 is connected to one end of a resistor $R_{ZN1}$, having its other end connected to one end of a DC isolation capacitor C1. The other end of the capacitor C1 is connected to chassis ground. The capacitor C1 provides DC isolation to chassis ground for the pair 102a,b in a similar manner as described previously. The resistance of the resistor $R_{ZN1}$ is preferably related to the resistances R1, R2 and R3 according to the following equation (3):

$$R_{ZN1} = \frac{Z_{OC}}{2} = R1 \| R2 + R3 \qquad (3)$$

In a similar manner, a conductive junction 217 within the termination circuit 216 electrically connects the wires 102g and 102h of the pair 102g,h together and to one end of a resistor $R_{ZN2}$. The other end of the resistor $R_{ZN2}$ is connected to one end of a DC isolation capacitor C2, having its other end connected to chassis ground. The capacitor C2 performs a similar DC isolation function as the capacitor C. The resistance of the resistor $R_{ZN2}$ is related to the resistors R4, R5 and R6 according to the following equation (4):

$$R_{ZN2} = \frac{Z_{OC}}{2} = R4 \| R5 + R6 \qquad (4)$$

Preferably, the common mode impedance $Z_{OC}$ between the unused pairs 102a,b and 102g,h are equal, so that the resistances $R_{ZN1}$ and $R_{ZN2}$ are preferably equivalent ($R_{ZN1}$=$R_{ZN2}$=$R_{ZN}$), and preferably each is approximately 75Ω. Also, the junction between $R_{ZN1}$ and $C_1$ and between $R_{ZN2}$ and $C_2$ may be connected together using an optional conductor 218.

According to the experimental results, the termination circuits 214 and 216 have been shown to reduce or otherwise eliminate EMI noise on the unused pairs 102a,b and 102g,h, which would otherwise interfere with the communication signals on the used twisted-wire pairs 102c,d and 102e,f. The termination scheme according to the present invention enables a network communication device, such as an NIC, hub, etc., to at least meet the requirements for an FCC Class A device.

It is easily seen that the termination circuits 214 and 216 are simpler than the corresponding termination circuits 114 and 116 of prior art. In particular, the three termination resistors R1, R2, R3 or R4, R5, R6 are replaced with single resistors $R_{ZN1}$ and $R_{ZN2}$, respectively. The conductive junctions 215 and 217 are electrical connections or shorts and, therefore, consume little or no extra space within the termination circuits 215, 217. In this manner, a single resistor replaces a plurality of resistors, thereby substantially reducing the cost and corresponding space consumed within the termination circuits 215, 217. The cost and space savings are further multiplied if the hub system 208 includes a multiple number of I/O ports 200 and corresponding RJ-45 jacks 106. Although the present invention is illustrated for use on a hub, such as the hub system 208, it may also be used to terminate the other ends of the twisted-wire pairs 102a,b and 102g,h. The other ends are provided to another hub system, or to a network interface card (NIC) plugged into an I/O port of a computer system (not shown) for interfacing the computer to the hub system 208, or to any other communication device of a network system.

Figure 3:
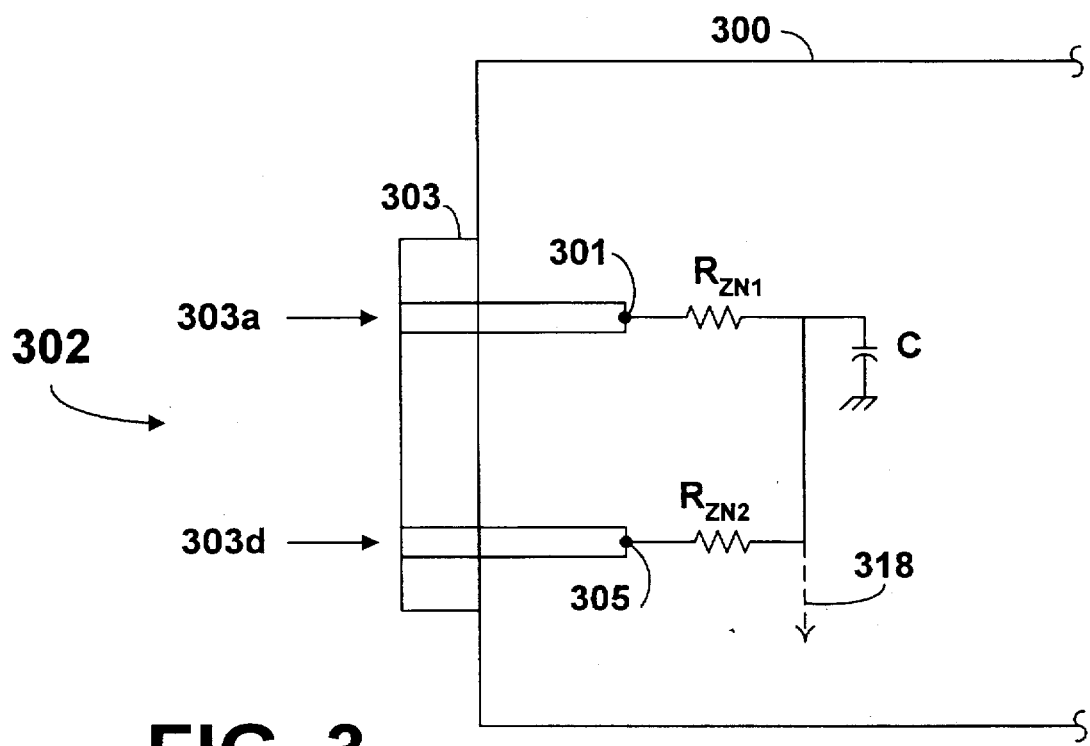
FIG. 3 is a schematic diagram of a hub system including a termination scheme according to an alternative embodiment of the present invention.

FIG. 3 is a schematic diagram illustrating a hub system 308 including a terminator 304 according to the present invention. The hub system 300 includes a port 302 including an RJ-45 jack 303 with conductor pairs 303a and 303d for interfacing corresponding unused twisted-wire pairs of a compatible RJ-45 twisted-pair cable (not shown). The wires of the conductor pair 303a are shorted together at a conductive junction 301 and the wires of the conductor pair 303d are shorted together at a conductive junction 305. One end of the resistor $R_{ZN1}$ is connected to the conductive junction 301 and one end of the resistor $R_{ZN2}$ is connected to the conductive junction 305. The hub system 300 includes a terminator circuit 304, which is similar to the terminator circuits 214 and 216 of FIG. 2, except that the other ends of each of the resistors $R_{ZN1}$ and $R_{ZN2}$ are coupled together and to one end of a single DC isolation capacitor C. The other end of the capacitor C is connected to chassis ground. The single capacitor C replaces the capacitors C1, C2 and may be implemented as a discrete capacitor or as a capacitance built into a printed circuit board (PCB) used for mounting components of the hub system 300. For example, the capacitor C may be incorporated between layers of a multiple layer PCB. Furthermore, an optional conductor 318 may be included for coupling the capacitor C to other terminators if the hub system 300 is a multiport hub.

Figure 4:
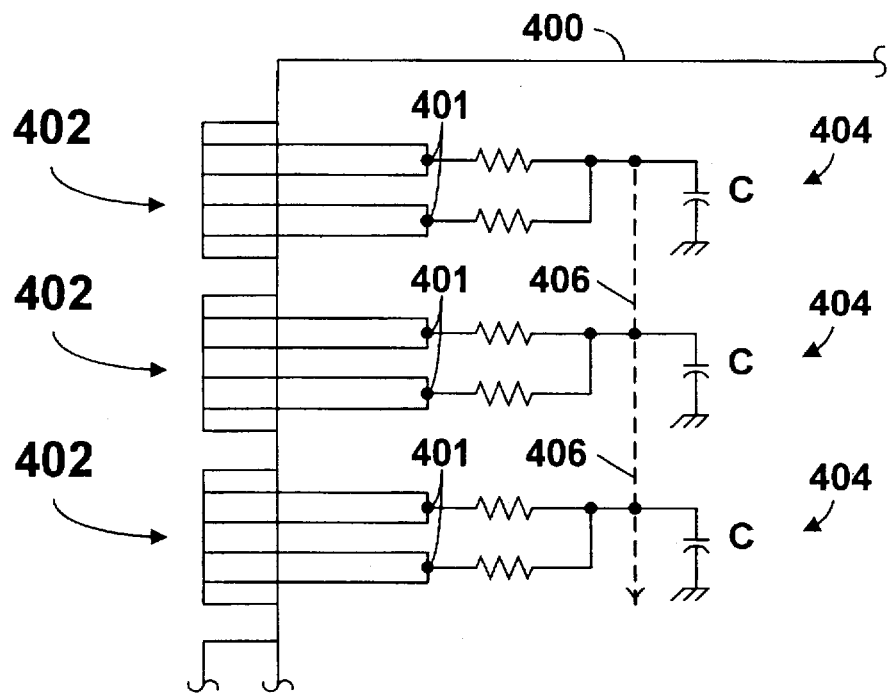
FIGS. 4 and 5 are schematic diagrams of multiport hub systems illustrating variations of embodiments according to the present invention.
Figure 5:
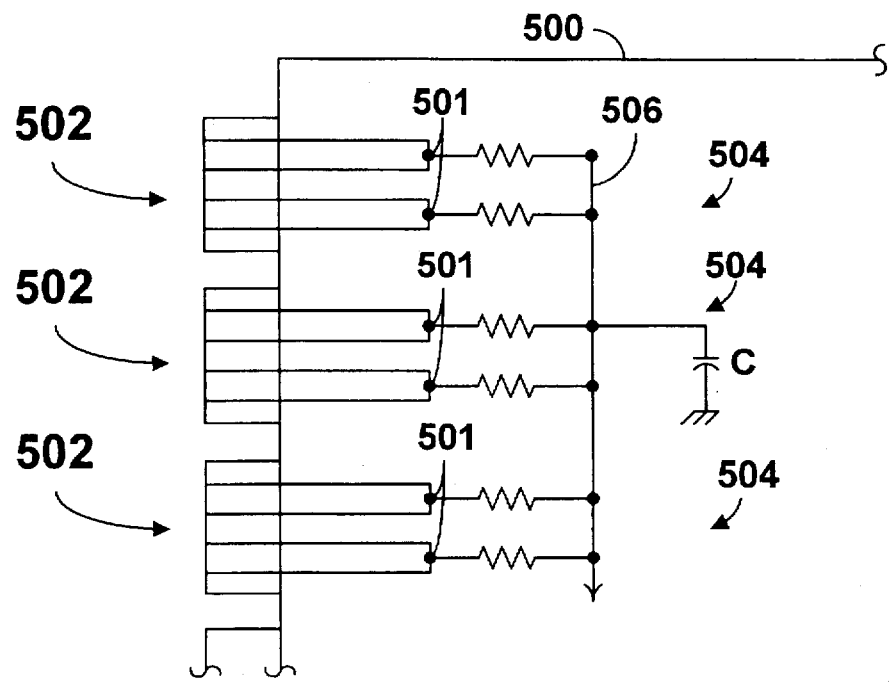

FIGS. 4 and 5 are schematic diagrams of multiport hub systems illustrating variations of embodiments according to the present invention. In FIG. 4, a multiport hub system 400 includes a plurality of ports 402, each implemented in substantially the same manner as the port 302 shown in FIG. 3. Also, each port 402 includes a terminator circuit 404 implemented in the same manner as the terminator circuit 304, where each terminator circuit 404 includes an isolation capacitor C. The wires of each conductive pair are shorted together at respective conductive junctions 401 as shown. In FIG. 4, optional conductors 406 electrically connect each of the capacitors C together. Although only three of the ports 402 and corresponding terminator circuits 404 are shown, any number of ports may be included. FIG. 5 shows a multiport hub system 500 including a plurality of ports 502 implemented in a similar manner as FIG. 3, except that terminator circuits 504 for each port 502 do not include separate capacitors. Instead, the isolation resistors of each terminator circuit 504 are coupled together and to one end of a single capacitor C using a conductor 506, where the other end of the capacitor 506 is connected to chassis ground. Also, the capacitor C may be implemented as a discrete capacitor or represent a capacitance built into a PCB as described previously, or implemented in any known manner as known to those skilled in the art. As before, the wires of each conductive pair are shorted together at respective conductive junctions 501 as shown.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A terminator for terminating a twisted-wire pair, comprising:

a conductive junction that electrically shorts the wires of the twisted-wire pair together; and a resistor coupled between said conductive junction and ground.

2. The terminator of claim 1, wherein said resistor has a resistance corresponding to a common mode impedance between the twisted-wire pair and another twisted-wire pair.

3. The terminator of claim 2, wherein said resistance of said resistor is equivalent to half of said common mode impedance.

4. The terminator of claim 1, wherein said resistor is approximately 75Ω.

5. The terminator of claim 1, further comprising:

a capacitor coupled between said resistor and ground for providing DC isolation.

6. The terminator of claim 1, wherein the terminator is provided within a hub system operating at 100 megabits per second.

7. A termination circuit for terminating first and second unused twisted-wire pairs of a multiple twisted-pair cable, comprising:

first and second conductive junctions that electrically short together individual wires of the first and second twisted-wire pairs, respectively; and first and second resistors coupled between said first and second conductive junctions, respectively, and ground.

8. The termination circuit of claim 7, wherein said first resistor has a resistance corresponding to a first common mode impedance of the first unused twisted-wire pair with respect to the second unused twisted-wire pair, and wherein said second resistor has a resistance corresponding to a second a common mode impedance of the second unused twisted-wire pair with respect to the first unused twisted-wire pair.

9. The termination circuit of claim 8, wherein said first and second common mode impedances are equal, and wherein said first and second resistors are equivalent to said first and second common mode impedances, respectively.

10. The termination circuit of claim 9, wherein said first and second resistors are both approximately 75Ω.

11. The termination circuit of claim 7, further comprising:
   first and second capacitors coupled between said first and second resistors, respectively, and ground.

12. The termination circuit of claim 7, further comprising:
   said first resistor having a first end coupled to said first conductive junction, and having a second end;
   said second resistor having a first end coupled to said second conductive junction, and having a second end coupled to said second end of said first resistor; and
   a capacitor coupled between said second ends of said first and second resistors and ground.

13. The termination circuit of claim 7, wherein the twisted-pair cable includes four twisted-wire pairs including a transmit pair and a receive pair.

14. The termination circuit of claim 13, wherein the twisted-pair cable enables transmission at 100 megabits per second.

15. The termination circuit of claim 14, wherein the twisted-pair cable is balanced and unshielded.

16. A termination scheme for use in a communication system for terminating two unused twisted-wire pairs of a multiple twisted-pair cable, the communication system including a chassis and at least one connector port for electrically coupling the twisted-pair cable, the termination circuit comprising:

first and second conductive junctions that electrically short together the wires of the first and second unused twisted-wire pairs, respectively; and
   first and second resistors for coupling between said first and second conductive junctions, respectively, and the chassis.

17. The termination scheme of claim 16, wherein the communication system is a multiport hub system including a plurality of connector ports for interfacing a plurality of multiple twisted-pair cables, each cable including two unused twisted wire pairs, the termination scheme further comprising:
   a plurality of conductive junction pairs, each said conductive junction pair corresponding to one of the plurality of connector ports and including a first and a second conductive junction for connecting together the wires of first and second unused twisted-wire pairs, respectively, of each connector port; and
   a plurality of resistor pairs, each said resistor pair corresponding to one of the plurality of conductive junction pairs and including a first and a second resistor for coupling between the chassis and said first and second conductive junctions, respectively.

18. The termination scheme of claim 17, further comprising:
   a plurality of capacitors, each said capacitor corresponding to one of the plurality of connector ports for coupling between a corresponding resistor pair and the chassis for each connector port.

19. The termination scheme of claim 17, further comprising:
   a capacitor coupled between all of said resistor pairs and the chassis.

20. The termination scheme of claim 17, wherein the multiport hub system operates at 100 megabits per second.

* * * * *